W. L. Haller,
Fruit Jar,
N° 61,827.  Patented Feb. 5, 1867.
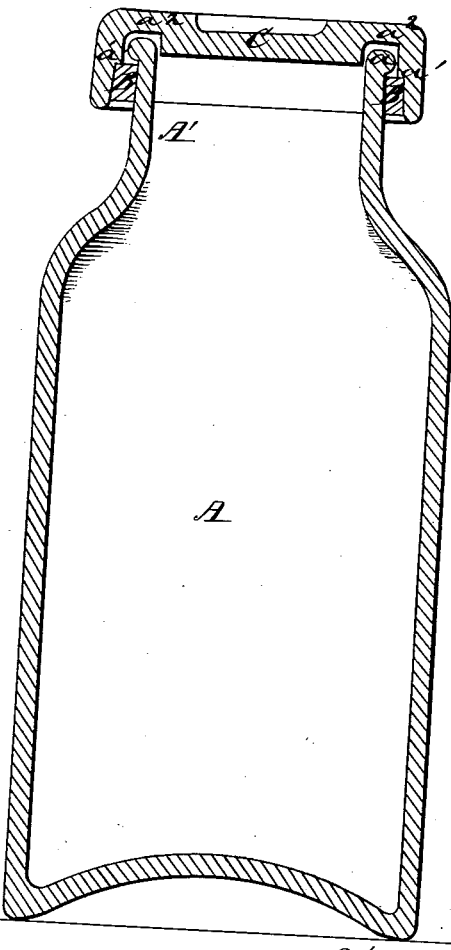
Witnesses
C. J. Smith
Alex. A. C. Klaucke
Inventor
Wm L. Haller
By Munn & Co
Attorneys

United States Patent Office.

WILLIAM L. HALLER, OF CARLISLE, PENNSYLVANIA.

Letters Patent No. 61,827, dated February 5, 1867.

IMPROVEMENT IN FRUIT JARS.

The Schedule referred to in these Letters Patent and making part of the same.

TO ALL WHOM IT MAY CONCERN:

Be it known that I, WILLIAM L. HALLER, of Carlisle, in the county of Cumberland, and State of Pennsylvania, have invented a new and useful Improvement in Fruit Jars; and I do hereby declare the following to be a full, clear, and exact description of the same, reference being had to the accompanying drawings, which are made part of this specification, and which represent a longitudinal central section of a fruit jar embodying my invention.

The subject of my invention is a glass fruit jar, having a conical neck and glass cap, whose interior is shaped in conformity with the neck, so that a rubber ring on the outside of the neck may be tightly wedged between the latter and the cap, in order to adapt the cap to be snugly applied, and prevent the admission of air to the interior of the jar. From a casual observation the jar, the subject of this invention, bears a close resemblance to some which have previously been devised, but a careful perusal of the following description will show it to comprise peculiarities which distinguish it from all others, and render it a more efficient article.

A represents a glass jar, formed with a conical or upwardly-tapering neck A', which terminates at top in a bead or projection, $a$, which forms a shoulder to form a bearing for the ring or gasket B, and prevent the latter slipping off at the top. C is a cap, which is composed of glass, and while covering the top of the jar extends downward so as to embrace the outside of the neck. The interior of the cap C is made tapering, to correspond with the conical form of the neck A'. Heretofore the use of glass caps embracing the neck of the jar has been attended with considerable difficulty for this reason: the neck of the jar, as a general thing, is made slightly elliptical instead of circular, requiring to be blown and ground to adapt the cap to be snugly fitted upon it. This finishing of the neck I accomplish by means of a tool, whereby the same may be shaped so as to effect a fit between it and the cap. This finishing is not to be regarded as a feature of my invention, but it is mentioned as a simpler and cheaper mode, and in order that the mode of constructing the jar may be fully understood. On the inside of the cap C is formed a shoulder, $a^1$, and a groove, $a^2$. To close the jar the ring B is first placed around the neck in contact with the shoulder $a$, and the cap C is forced down over the ring, so as to wedge the latter tightly between the cap and the neck of the jar. The movement of the cap relatively to the ring is arrested by the ring coming in contact with the shoulder $a^1$, when the further depression of the cap causes the top of the neck to enter and occupy the groove $a^2$, whereby the true position of the cap is insured. The fruit is placed in the jar in a somewhat heated condition, so that when it cools there will be formed a vacuum between the fruit and the cap, air being excluded by the rubber ring. The external pressure of the atmosphere upon the cap then aids the ring in preventing the displacement of said cap.

I am aware that it is not new to use a glass cap in connection with a jar whose neck is partially embraced thereby, but I know of no previous instance where the embracing glass cap has been used in connection with a conical neck, the latter to secure the ring B, which holds on the cap, and also excludes air from the jar. The jar may be opened by inserting a knife blade, or a device made especially for the purpose, between the ring B and the neck, so as to admit air into the jar, after which the cap can be readily taken off.

Having thus described my invention, the following is what I claim as new herein, and desire to secure by Letters Patent:

I claim a glass jar having a conical neck having a rubber ring, movable on its exterior, and depressed by the shoulder $a^1$ of the lid C, whose groove, $a^2$, in combination with the lip $a$, forms a nearly tight joint to keep the fruit from contact with the rubber, the whole arranged substantially as described and represented.

The above specification of my improvement in fruit jars signed this 12th day of July, 1865.

WILLIAM L. HALLER.

Witnesses:
  ALEX. A. C. KLAUCKE,
  C. D. SMITH.